(12) United States Patent
Okada

(10) Patent No.: US 7,098,791 B2
(45) Date of Patent: Aug. 29, 2006

(54) SECURITY SYSTEM AND PORTABLE DEVICE USABLE THEREIN

(75) Inventor: Hirofumi Okada, Niwa-gun (JP)

(73) Assignee: Kabushiki Kaisha Tokai Rika Denki Seisakusho, (JP)

( * ) Notice: Subject to any disclaimer, the term of this patent is extended or adjusted under 35 U.S.C. 154(b) by 24 days.

(21) Appl. No.: 10/733,048

(22) Filed: Dec. 10, 2003

(65) Prior Publication Data

US 2004/0124969 A1 Jul. 1, 2004

(30) Foreign Application Priority Data

Dec. 11, 2002 (JP) ............... 2002-359039

(51) Int. Cl.
*G08B 13/14* (2006.01)

(52) U.S. Cl. .............. 340/568.1; 340/457; 340/426.13; 340/5.75; 340/5.61; 340/825.72; 70/257; 70/456 R

(58) Field of Classification Search ................ 340/457, 340/568.1, 426.13–426.17, 5.72, 5.67, 5.61–5.64, 340/825.72, 825.69; 70/252, 257, 408, 432, 70/456 R, 459, 460, 278.1, 278.2, 278.3, 70/279.1–282
See application file for complete search history.

(56) References Cited

U.S. PATENT DOCUMENTS

| 5,220,319 | A | * | 6/1993 | Kendel ................. 340/825.69 |
| 5,254,996 | A | * | 10/1993 | Claar et al. ................. 341/176 |
| 5,561,331 | A | * | 10/1996 | Suyama et al. ............ 307/10.3 |
| 6,016,676 | A | * | 1/2000 | McConnell ................... 70/408 |
| 6,034,617 | A | * | 3/2000 | Luebke et al. ............. 340/5.62 |
| 6,275,141 | B1 | * | 8/2001 | Walter ....................... 340/5.64 |
| 6,460,386 | B1 | * | 10/2002 | Watanuki et al. ......... 70/456 R |
| 6,553,802 | B1 | * | 4/2003 | Jacob ....................... 70/456 R |
| 6,731,196 | B1 | * | 5/2004 | Ruediger ................... 340/5.61 |
| 2002/0067249 | A1 | * | 6/2002 | Johnson et al. ............. 340/426 |

FOREIGN PATENT DOCUMENTS

| EP | 0987389 | 3/2000 |
| JP | 2002-247656 | 8/2002 |
| WO | WO 00/73606 A1 | 12/2000 |
| WO | WO 01/21001 A1 | 3/2001 |

* cited by examiner

*Primary Examiner*—Daniel Wu
*Assistant Examiner*—Travis R. Hunnings
(74) *Attorney, Agent, or Firm*—Synnestvedt & Lechner LLP

(57) ABSTRACT

A security system for notifying a driver that a mechanical key is being retained in a portable device. The portable device has an indicator that is illuminated when the mechanical key is not retained in the portable device.

12 Claims, 11 Drawing Sheets

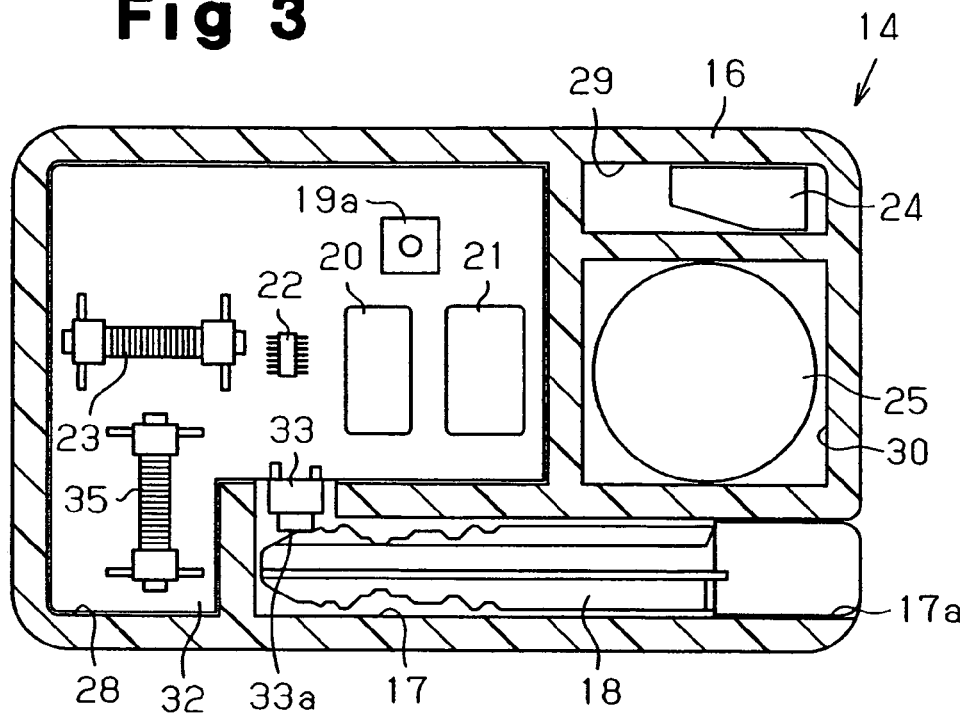
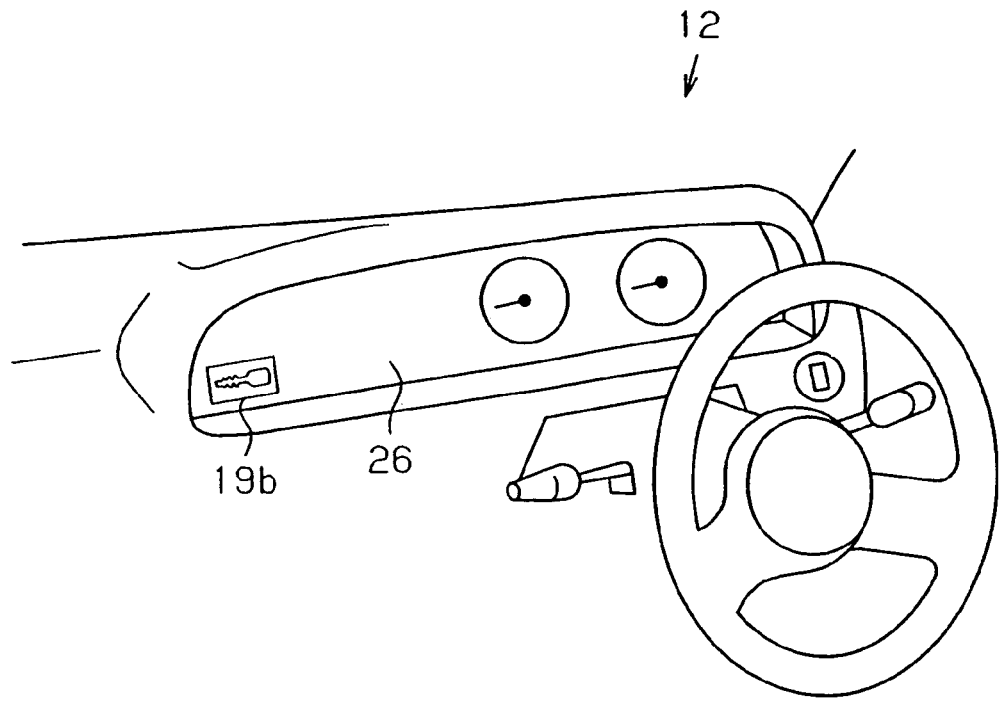

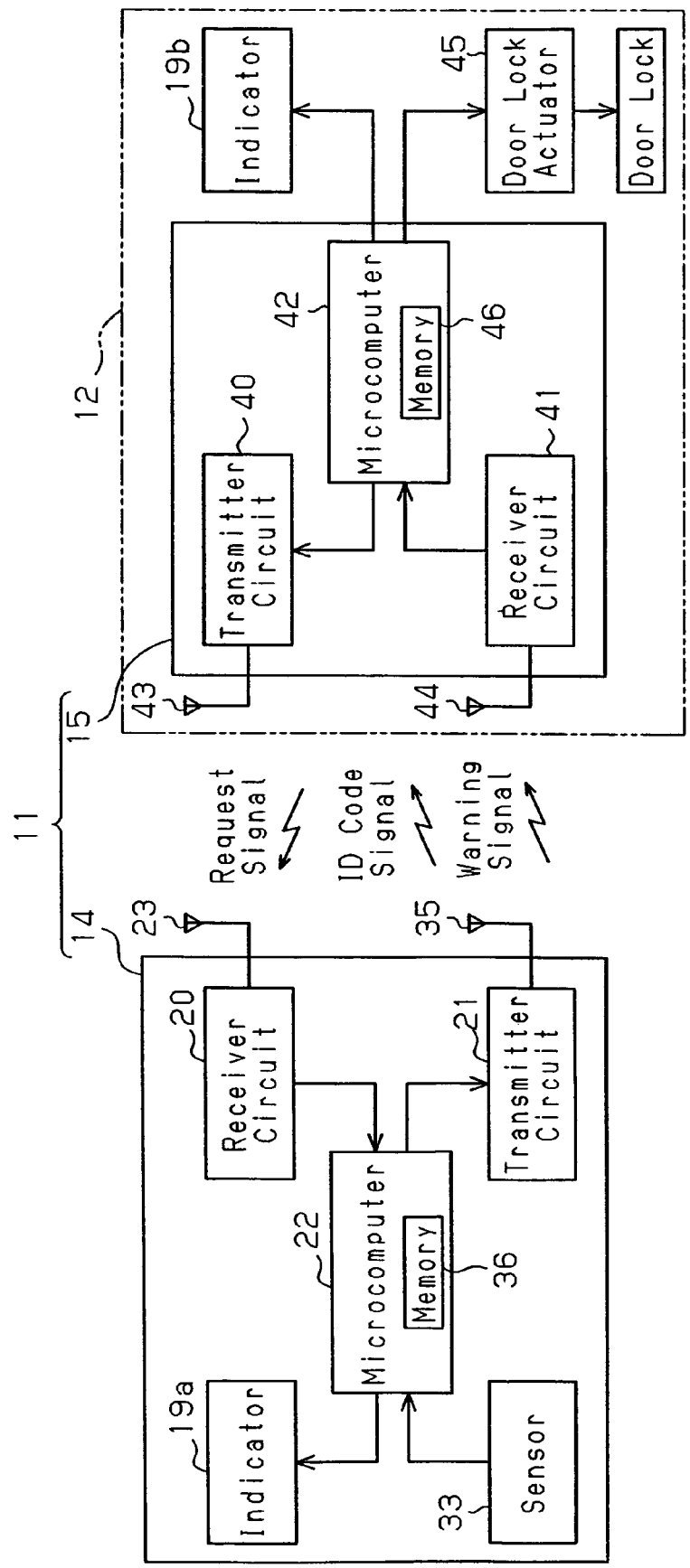

(Mechanical Key Retained)

(Mechanical Key Not Retained)

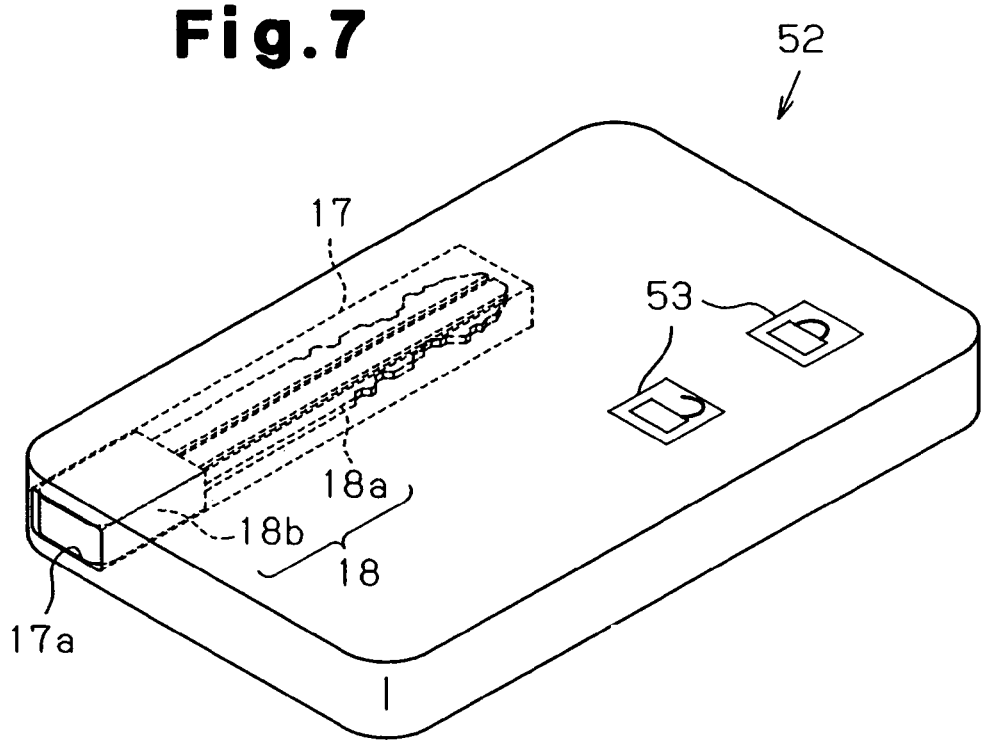
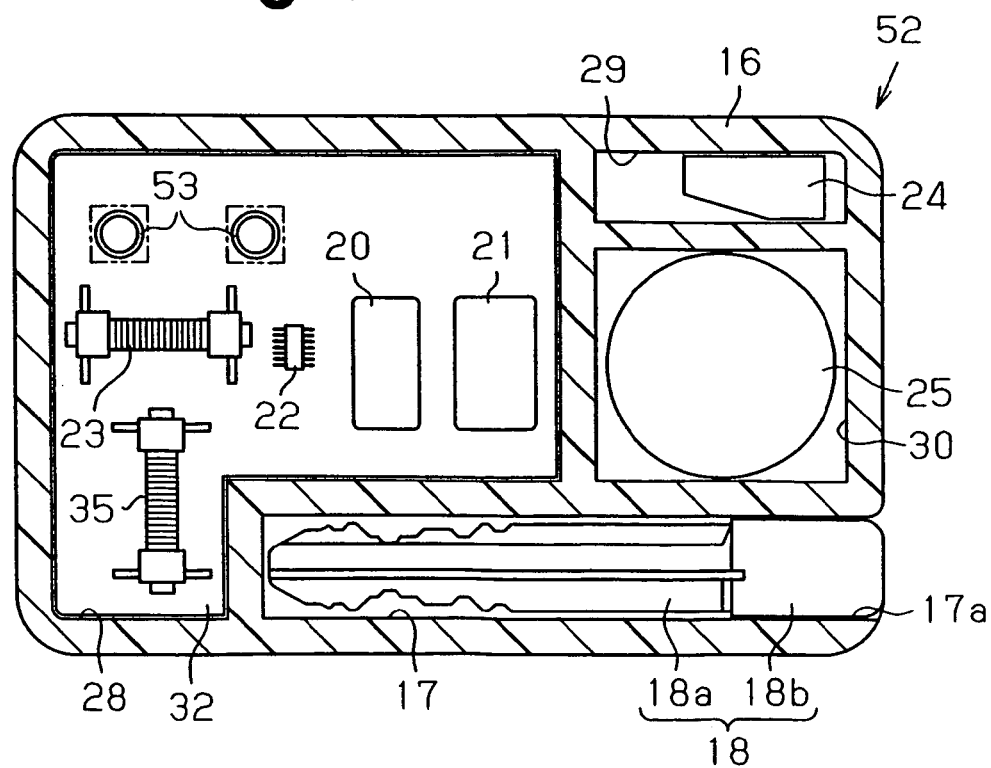

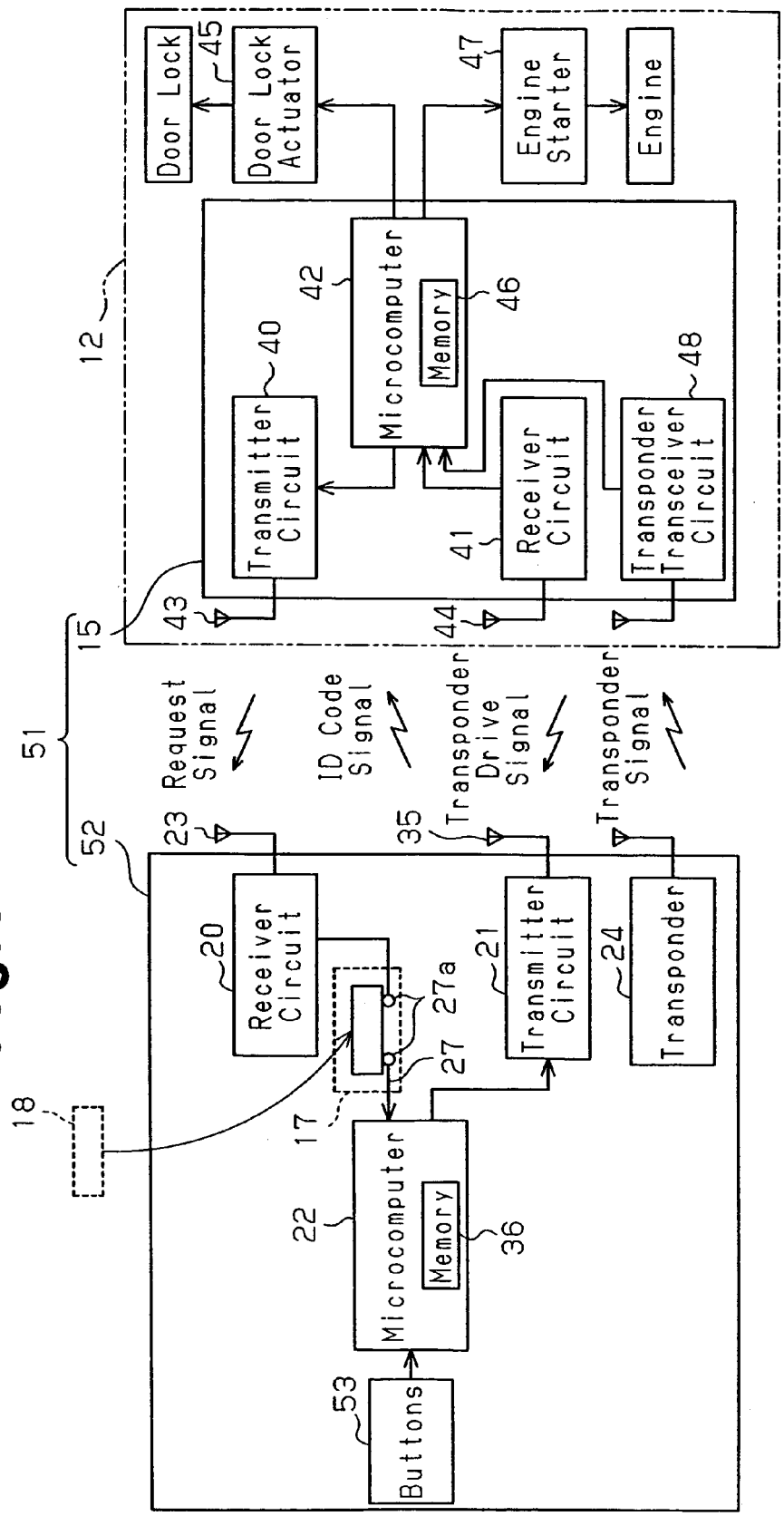

SECURITY SYSTEM AND PORTABLE DEVICE USABLE THEREIN

BACKGROUND OF THE INVENTION

The present invention relates to a security system, and more particularly, to a system for closing and opening a door lock of a vehicle through wireless communication with a portable device.

Japanese Laid-Open Patent Publication No. 2002-247656 describes a vehicle security system, or a smart entry device. The smart entry device includes a portable device, which is carried by a driver, and a door lock controller. The door lock controller performs wireless communication with the portable device, automatically opens the door locks of a vehicle when the driver approaches the vehicle, and automatically closes the door locks when the driver moves away from the vehicle.

FIG. 15 shows a prior art portable device 80. A case 81 accommodates a battery and electric components (not shown). Further, the case 81 includes a transponder 82, which is used in an emergency state such as when the battery voltage decreases, and a mechanical key 83, which is retained in a key retainer 84. If the portable device 80 cannot perform wireless communication when the voltage of the battery decreases, the driver removes the mechanical key 83 from the key retainer 84, uses the mechanical key 83, and mechanically opens and closes the door locks.

Since the door locks are normally opened and closed through wireless communication with the portable device 80, the mechanical key 83 is seldom used. Thus, the driver may keep carrying the portable device 80 without noticing that he or she has lost the mechanical key 83 or forgotten to return the mechanical key 83 to the key retainer 84. In such a case, if wireless communication with the portable device 80 is disabled when the voltage of the battery decreases and the mechanical key 83 is not retained in the portable device 80, the driver cannot open or close the door locks. This would be inconvenient since the driver would not be able to enter the vehicle.

SUMMARY OF THE INVENTION

One aspect of the present invention is a security system for use with a locked subject having a lock that can be electronically activated. The security system includes a mechanical key for mechanically opening and closing the lock of the locked subject. A portable device has a wireless communication function and includes a key retainer for retaining the mechanical key. An activation controlling means performs wireless communication between the locked subject and the portable device. The locked subject outputs a request signal during the wireless communication. The portable device outputs an ID code signal in response to the request signal, and the activation controlling means controls the activation of the lock in accordance with the ID code signal. A notifying means notifies a driver whether the mechanical key is retained in the key retainer.

Another aspect of the present invention is a security system for use with a locked subject having a lock that can be electronically activated. The security system includes a mechanical key for mechanically opening and closing the lock of the locked subject. A portable device includes a key retainer for retaining the mechanical key. The portable device performs wireless communication with the locked subject. An operation portion is arranged on the portable device. A manual activation controlling means includes a first control for performing control of the wireless communication between the locked subject and the portable device, and a second control for sending an ID code signal to the locked subject and activating the lock when the operation portion is operated. A disabling means disables at least one of the controls of the manual activation controlling means when the key retainer is not retained in the mechanical key.

A further aspect of the present invention is a portable device for use in a security system that includes a locked subject having a lock. The security system controls opening and closing of the lock in accordance with an ID code signal. The portable device includes a key retainer for retaining a mechanical key that mechanically opens and closes the lock. A key detector detects whether the mechanical key is retained in the key retainer. The portable device is operable for outputting the ID code signal.

A further aspect of the present invention is a security system including a lock. A mechanical key mechanically opens and closes the lock. A portable device includes a wireless key that performs wireless communication and includes a key retainer for retaining the mechanical key. A lock controller opens and closes the lock when wireless communication with the wireless key is established. A sensor is arranged in the wireless key to detect whether the mechanical key is retained in the retainer. A notifying device notifies a person carrying the portable device that the mechanical key is being retained in the key retainer.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a cross-sectional view of the portable device of FIG. 2;

FIG. 4 is a perspective view showing a passenger compartment of FIG. 1;

FIG. 5 is a block diagram of the portable device of FIG. 2;

FIG. 7 is a perspective view showing a portable device according to a second embodiment of the present invention;

FIG. 8 is a cross-sectional view of the portable device of FIG. 7;

FIG. 9 is a block diagram of the portable device of FIG. 7;

DETAILED DESCRIPTION OF THE PREFERRED EMBODIMENTS

A vehicle security system according to a first embodiment of the present invention will now be discussed with reference to FIGS. 1 to 6B.

Figure 1:
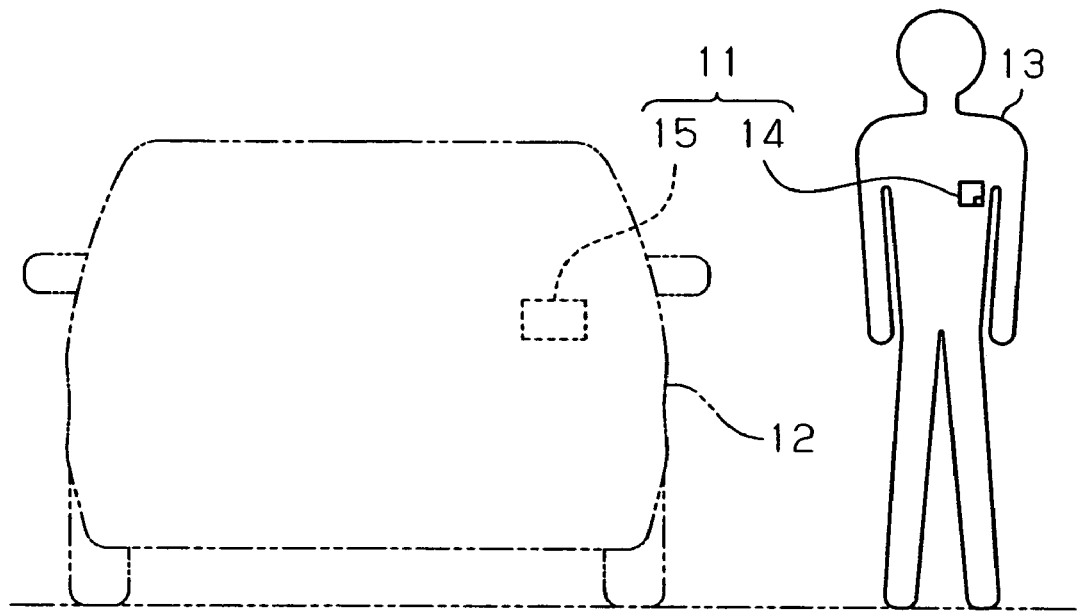
FIG. 1 is a schematic diagram illustrating a security system according to a first embodiment of the present invention.

Referring to FIG. 1, a security system 11 includes a door lock controller 15, which is installed in a vehicle 12 (locked subject). The security system 11 also includes a portable device (wireless key) 14 that can be carried by a person using the device, e.g., a driver 13. The portable device 14 performs wireless communication with the door lock controller 15. Wireless communication for ID verification is performed between the portable device 14 and the door lock controller 15. The door lock controller 15 opens and closes the door locks of the vehicle 12 in accordance with the ID verification result. Accordingly, the security system 11 is provided with a smart entry function.

Figure 2:
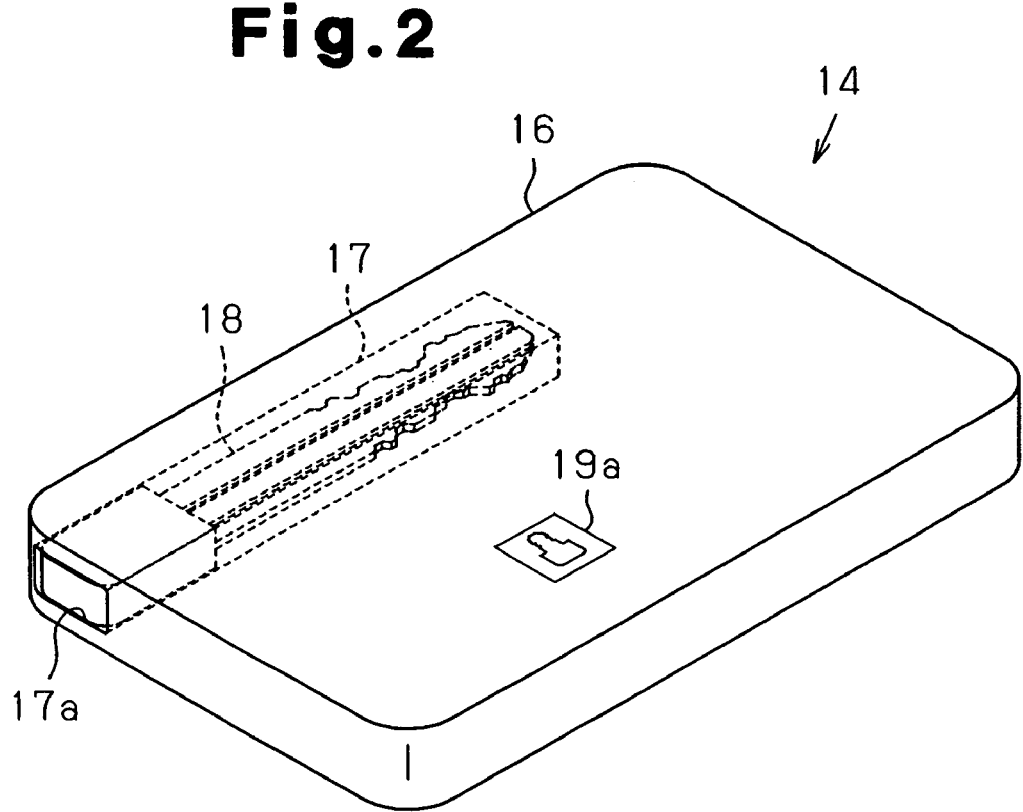
FIG. 2 is a perspective view showing a portable device in the first embodiment.

As shown in FIG. 2, the portable device 14 has a thin case 16 provided with a key retainer 17. The key retainer 17 extends in the longitudinal direction of the case 16 from an opening 17*a*. The key retainer 17 retains a mechanical key 18, which is used during an emergency such as when decrease of the battery voltage disables wireless communication. The mechanical key 18 is removed from the key retainer 17 during usage. A portable device indicator 19*a* is exposed from the outer surface of the portable device 14. The portable device indicator 19*a* lets the driver know whether the mechanical key 18 is retained in the key retainer 17 and functions as a portable warning device.

Referring to FIG. 3, in addition to the key retainer 17, the case 16 has a circuit compartment 28, a transponder compartment 29, and a battery compartment 30. A circuit board 32 is arranged in the circuit compartment 28. A portable device receiver circuit 20, a portable device transmitter circuit 21, a microcomputer 22 serving as a portable device controller, coil antennas 23 and 35, and a portable device indicator 19*a* are arranged in the portable device controller. A transponder 24 is arranged in the transponder compartment 29. A battery 25 is arranged in the battery compartment 30.

The mechanical key 18 is retained in the key retainer 17 of the case 16. The key retainer 17 includes a key detection sensor 33, which functions as a key detector for detecting whether or not the mechanical key 18 is retained in the key retainer 17. The key detection sensor 33 is a movable contact type microswitch and includes a movable portion 33*a*. The key detection sensor 33 detects the mechanical key 18 when pressed by the distal portion of the mechanical key 18. The key detection sensor 33 is arranged at an innermost portion of the key retainer 17 to contact the mechanical key 18 when the mechanical key 18 is retained in the key retainer 17.

With reference to FIG. 4, a vehicle indicator 19*b* is arranged on an instrument panel 26 in the passenger compartment of the vehicle 12. The vehicle indicator 19*b* functions as a locked subject warning device that lets the driver know whether the mechanical key 18 is retained in the key retainer 17. In the first embodiment, the portable device indicator 19*a* and the vehicle indicator 19*b* are each a filament lamp or a light-emitting diode (LED) that is illuminated when the mechanical key 18 is not retained in the key retainer 17.

The electrical components of the security system 11 will now be discussed. Referring to FIG. 5, the portable device 14 includes a portable device receiver circuit 20, a portable device transmitter circuit 21, and a portable device microcomputer 22. A receiving coil antenna 23 is connected to the portable device receiver circuit 20, and a portable device transmission antenna 35 is connected to the portable device transmitter circuit 21. When receiving a request signal from the vehicle 12, the portable device receiver circuit 20 demodulates the request signal to a pulse signal and provides the demodulated request signal to the portable device microcomputer 22.

The portable device microcomputer 22 includes a portable device memory 36. An ID code is registered in the portable device memory 36. In response to the request signal from the portable device receiver circuit 20, the portable device microcomputer 22 provides the portable device transmitter circuit 21 with an ID code signal that includes an ID code recorded in the portable device memory 36. The transmitter circuit 21 converts the ID code signal to a radio wave having a predetermined frequency and transmits the radio wave through the portable device transmission antenna 35.

The key detection sensor 33 and the portable device indicator 19*a* are electrically connected to the portable device microcomputer 22. The key detection sensor 33 provides the portable device microcomputer 22 with a detection signal indicating whether the mechanical key 18 is retained in the key retainer 17. The portable device microcomputer 22 determines whether the mechanical key 18 is being retained in the key retainer 17 from the detection signal. When the mechanical key 18 is not retained in the key retainer 17, the portable device microcomputer 22 generates a warning signal and illuminates the portable device indicator 19*a*. The warning signal is transmitted to the vehicle 12 through the portable device transmission antenna 35. Accordingly, the portable device 14 transmits the ID code signal and the warning signal through the portable device transmission antenna 35.

When the mechanical key 18 is retained in the key retainer 17, the portable device microcomputer 22 does not generate the warning signal and doe not illuminate the portable device indicator 19*a*.

The door lock controller 15 includes a vehicle transmitter circuit 40, a vehicle receiver circuit 41, and a vehicle microcomputer 42, which functions as a locked subject controller. The vehicle transmitter circuit 40 is connected to a vehicle transmission antenna 43, and the vehicle receiver circuit 41 is connected to a vehicle receiving antenna 44. The vehicle transmitter circuit 40 converts the request signal from the vehicle microcomputer 42 to a radio wave or an electromagnetic signal. The request signal is transmitted out of the vehicle 12 to a predetermined range through the vehicle transmission antenna 43.

The vehicle receiving antenna 44 receives the ID code signal and warning signal from the portable device 14. The vehicle receiver circuit 41 provides the vehicle microcomputer 42 with the ID code signal and the warning signal.

The vehicle indicator 19*b* and a door lock actuator 45 are electrically connected to the vehicle microcomputer 42. The door lock actuator 45 drives the door locks in accordance with an electronic signal received from the vehicle microcomputer 42.

The vehicle microcomputer 42 includes a vehicle memory 46. An ID code is registered in the vehicle memory 46. The vehicle microcomputer 42 intermittently outputs the request signal. In response to the request signal, the portable device 14 returns an ID code signal to the vehicle receiver circuit 41. When the vehicle receiver circuit 41 receives the ID code signal, the vehicle microcomputer 42 compares and verifies an ID code included in the ID code signal with the ID code registered in the vehicle memory 46. When the two ID codes match, the vehicle microcomputer 42 opens the door locks. When the ID code signal is not received or when the two ID codes do not match, the vehicle microcomputer 42 keeps the door locks closed.

When the vehicle receiver circuit 41 receives the warning signal, the vehicle microcomputer 42 illuminates the vehicle indicator 19b. When the warning signal is not received, the vehicle microcomputer 42 does not illuminate the vehicle indicator 19b.

The portable device indicator 19a, the vehicle indicator 19b, the portable device transmitter circuit 21, the portable device microcomputer 22, the key detection sensor 33, the vehicle receiver circuit 41, and the vehicle microcomputer 42 function as a notifying means for notifying the driver 13 whether the mechanical key 18 is retained in the key retainer 17.

The portable device receiver circuit 20, the portable device transmitter circuit 21, the portable device microcomputer 22, the vehicle transmitter circuit 40, the vehicle receiver circuit 41, the vehicle microcomputer 42, and the door lock actuator 45 function as an activation controlling means of the smart entry function.

The operation of the security system 11 will now be discussed.

Figure 6A:
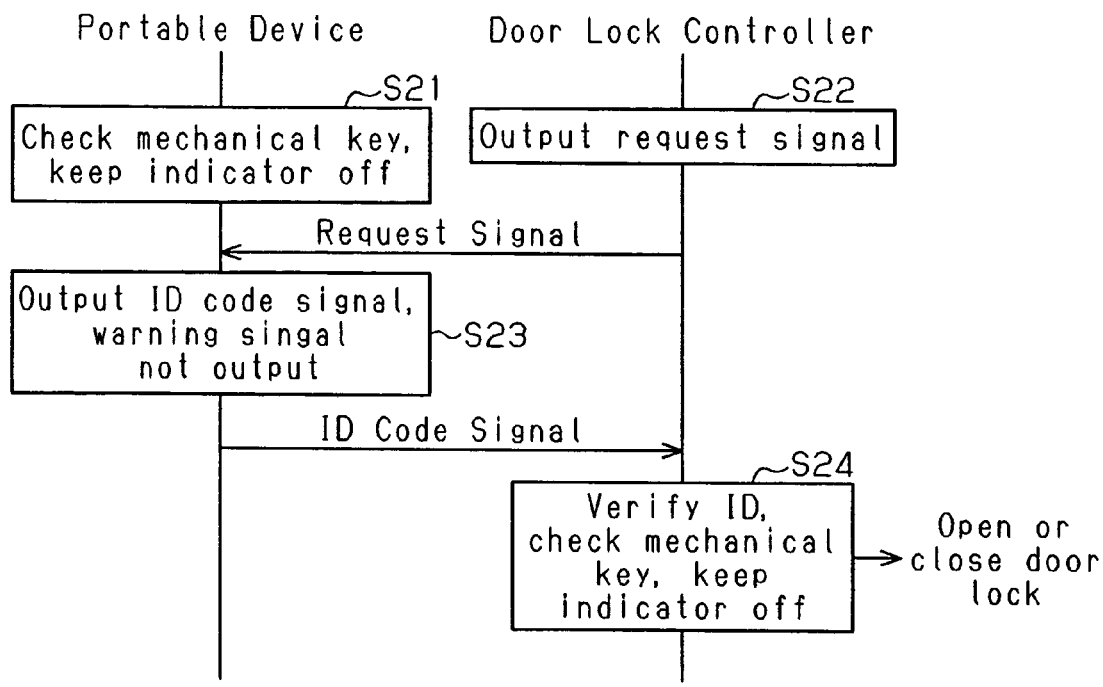
FIGS. 6A and 6B are sequence diagrams illustrating the security system in an operation mode.

FIG. 6A, state in which the mechanical key 18 is retained in the portable device 14:

In step S21, the key detection sensor 33 of the portable device 14 checks whether the mechanical key 18 is retained in the key retainer 17. When the mechanical key 18 is retained in the key retainer 17, the portable device microcomputer 22 keeps the portable device indicator 19a turned off. Since the portable device indicator 19a is not illuminated, the driver 13 can confirm that the mechanical key 18 is retained in the key retainer 17.

In step S22, the door lock controller 15 transmits a request signal in a predetermined range around the vehicle 12. When the driver 13 who is carrying the portable device 14 is in the predetermined range, the portable device 14 transmits the ID code signal in response to the request signal but does not transmit the warning signal (step S23).

In step S24, the door lock controller 15 receives the ID code signal transmitted from the portable device 14. The vehicle microcomputer 42 then performs ID verification and opens or closes the door locks in accordance with the ID verification result. Since the vehicle microcomputer 42 does not receive the warning signal, the vehicle microcomputer 42 determines that the mechanical key 18 is retained in the key retainer 17 and keeps the vehicle indicator 19b turned off. Since the vehicle indicator 19b is not illuminated, the driver 13 can confirm that the mechanical key 18 is retained in the key retainer 17.

Figure 6B:
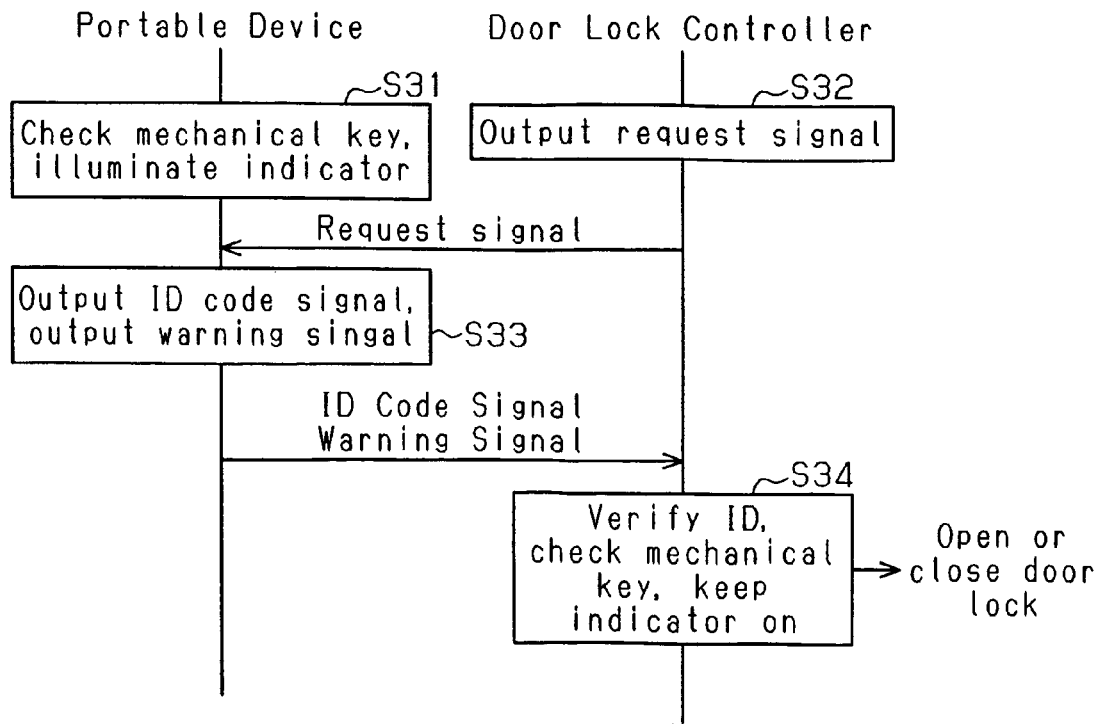

FIG. 6B, state in which the mechanical key 18 is not retained in the portable device 14:

In step S31, the key detection sensor 33 checks whether the mechanical key 18 is retained in the key retainer 17. When the mechanical key 18 is not retained in the key retainer 17, the portable device microcomputer 22 illuminates the portable device indicator 19a. Since the portable device indicator 19a is illuminated, the driver 13 can confirm that the mechanical key 18 is not retained in the key retainer 17.

In step S32, the door lock controller 15 transmits a request signal in a predetermined range around the vehicle 12. When the driver 13 who is carrying the portable device 14 is in the predetermined range, the portable device 14 transmits the ID code signal and the warning signal in response to the request signal (step S33).

In step S34, the door lock controller 15 receives the ID code signal and the warning signal. The vehicle microcomputer 42 then performs ID verification and opens or closes the door locks in accordance with the ID verification result. Since the vehicle microcomputer 42 receives the warning signal, the vehicle microcomputer 42 determines that the mechanical key 18 is not retained in the key retainer 17 and illuminates the vehicle indicator 19b. The illumination of the vehicle indicator 19b enables the driver 13 to confirm that the mechanical key 18 is not retained in the key retainer 17.

The first embodiment has the advantages described below.

(1) By keeping the indicators 19a and 19b turned off or by illuminating the indicators 19a and 19b, the security system 11 lets the driver 13 know whether the mechanical key 18 is being retained in the portable device 14, that is, whether the driver 13 is carrying the mechanical key 18 together with the portable device 14. The security system 11 enables the driver 13 to pay attention to keeping the mechanical key 18 retained in the portable device 14. Accordingly, the mechanical key 18 enables the doors of the vehicles 12 to be locked and unlocked even during an emergency such as when the battery of the portable device 14 is drained.

(2) The vehicle indicator 19b is arranged on the instrument panel 26 in the passenger compartment. This lets the driver 13 know whether he or she is carrying the mechanical key 18. Thus, even if the portable device 14 is kept in a wallet or a pocket, the driver 13 can recognize whether he or she is carrying the mechanical key 18 together with the portable device 14.

(3) The key detection sensor 33 is arranged at an innermost portion of the key retainer 17 so that it contacts the distal portion of the mechanical key 18 when the mechanical key 18 is retained in the key retainer 17. Thus, the key detection sensor 33 does not detect anything other than the mechanical key 18. This prevents erroneous detection with the key detection sensor 33. Accordingly, the security system 11 has high reliability.

A vehicle security system 51 according to a second embodiment of the present invention will now be discussed centering on parts differing from the first embodiment.

Referring to FIG. 9, the security system 51 includes a portable device 52 and a door lock controller 15, which is installed in a vehicle 12. Referring to FIG. 7, the portable device 52 includes two push buttons 53 that are operated to transmit an ID code signal. The mechanical key 18 is retained in the portable device 52 and has a conductive key plate 18a and a grip 18b.

Referring to FIG. 8, the portable device 52 has a case 16. The case 16 accommodates the mechanical key 18, a portable device receiver circuit 20, a portable device transmitter circuit 21, a portable device microcomputer 22, coil antennas 23 and 35, a transponder 24, a battery 25, and the push buttons 53. When each push button 53 is operated, the push button 53 generates an operation signal and provides the operation signal to the portable device microcomputer 22. The portable device microcomputer 22 generates an ID code signal in response to the operation signal.

The transponder 24, which is arranged in a transponder compartment 29 of the portable device 52, outputs a transponder signal including a predetermined transponder ID code when receiving electromagnetic wave energy. More specifically, when the portable device 52 is inserted in a portable device holder, which is located near the driver seat in the passenger compartment, the transponder 24 receives a transponder drive radio wave from the vehicle and outputs the transponder signal in response to the transponder drive radio wave.

The transponder 24 outputs the transponder signal if the mechanical key 18 is retained in the key retainer 17 when the transponder drive radio wave is received. Contrarily, the transponder 24 does not output the transponder signal if the mechanical key 18 is not retained in the key retainer 17 when the transponder drive radio wave is received.

The door lock controller 15 that opens and close the door locks of the vehicle 12 includes a vehicle transmitter circuit 40, a vehicle receiver circuit 41, a vehicle microcomputer 42, and a transponder transceiver circuit 48. The vehicle microcomputer 42 is electrically connected to a door lock actuator 45 and an engine starter 47.

When the portable device 52 is inserted in the portable device holder, the vehicle microcomputer 42 outputs a transponder drive signal to the transponder transceiver circuit 48. When the transponder transceiver circuit 48 receives the transponder signal, the vehicle microcomputer 42 compares the ID code included in the transponder signal with the ID code registered in the memory 46. When the ID codes match, the vehicle microcomputer 42 provides the engine starter 47 with an engine start enabling signal. When the ID codes do not match, the vehicle microcomputer 42 does not generate the engine start enabling signal.

The portable device receiver circuit 20 and the portable device microcomputer 22 are each connected to one of the two ends of a signal line 27, which includes two contacts 27a. When the mechanical key 18 is retained in the key retainer 17, the key plate 18a of the mechanical key 18 connects the two contacts 27a. This electrically connects the portable device receiver circuit 20 and the portable device microcomputer 22.

When the two contacts 27a are in a closed state, the portable device receiver circuit 20 receives the request signal from the vehicle 12. The portable device receiver circuit 20 demodulates the request signal to a pulse signal and provides the demodulated signal to the portable device microcomputer 22 through part of the mechanical key 18 and the signal line 27.

In the second embodiment, the security system is provided with a keyless entry function, which opens and closes the door locks when the push buttons 53 are operated, and a smart entry function, which opens and closes doors in accordance with the request signal and the ID code signal.

When the mechanical key 18 is not retained in the key retainer 17, the contacts 27a are opened to electrically disconnect the portable device receiver circuit 20 and the portable device microcomputer 22. In this state, the request signal transmitted from the vehicle 12 is not provided to the portable device microcomputer 22. Thus, the door locks are not automatically opened even when the driver 13 approaches the vehicle 12. Accordingly, the smart entry function is disabled in the security system 51. The signal line 27, which has the two contacts 27a, functions as a disabling means.

The operation of the security system 51 will now be discussed.

Figure 10A:
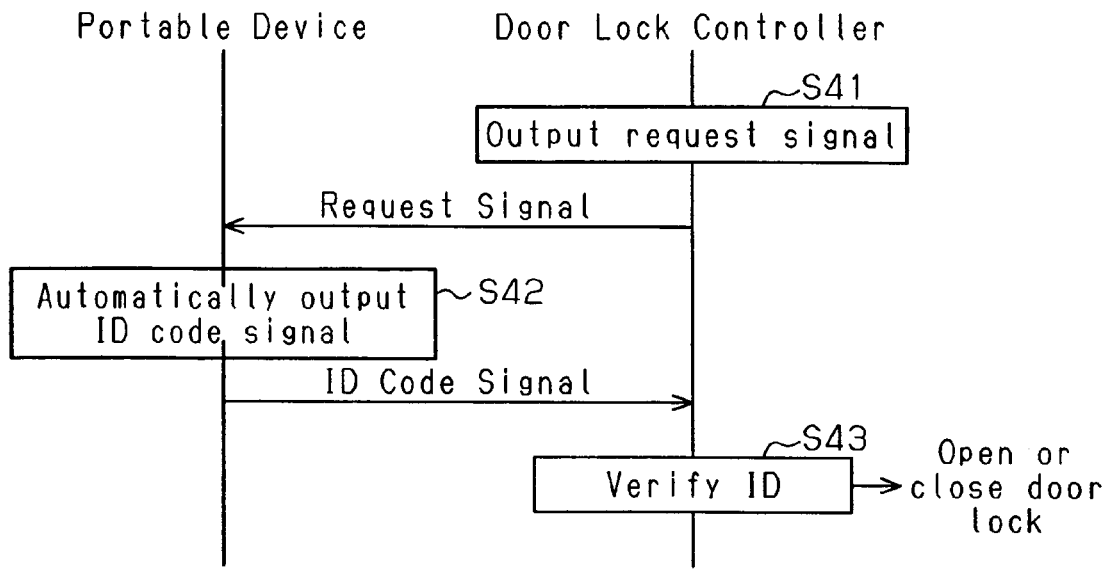
FIGS. 10A and 10B are sequence diagrams illustrating the security system in an operation mode.

FIG. 10A, state in which the mechanical key 18 is retained in the portable device 52:

In step S41, the door lock controller 15 outputs the request signal in a predetermined range. When the mechanical key 18 is retained in the key retainer 17, the portable device receiver circuit 20 is connected to the portable device microcomputer 22. Thus, in step S42, if the driver 13, who is holding the portable device 52, is in the predetermined range, the portable device 52 automatically transmits the ID code signal in response to the request signal. In step S43, the door lock controller 15 receives the ID code signal. The vehicle microcomputer 42 performs ID verification and opens or closes the door locks in accordance with the ID verification result. In this case, the driver 13 enters the vehicle 12 using the smart entry function.

When the voltage of the battery 25 for the portable device 52 decreases, the portable device 52 cannot automatically transmit the ID code signal in step S42. Further, the driver 13 cannot enter the vehicle 12 using the smart entry function. In this case, the driver 13 removes the mechanical key 18 from the key retainer 17 and uses the mechanical key 18 to open or close the door locks.

Then, to start the engine, the driver 13 inserts the portable device 52 in the portable device holder, which is located near the driver seat. Since the mechanical key 18 is retained in the key retainer 17, the transponder 24 in the portable device 52 outputs the transponder signal including the ID code. The vehicle microcomputer 42 performs ID verification and provides the engine starter 47 with an engine start enabling signal in accordance with the result of the ID verification. This enables the starting of the engine.

When the driver 13 forgets to return the mechanical key 18 to the key retainer 17 after opening the doors, the transponder 24 of the portable device 52 does not output the transponder signal. This is because the mechanical key 18 is not retained in the key retainer 17 even if the driver 13 inserts the portable device 52 in the portable device holder to start the engine. In this case, the vehicle microcomputer 42 does not provide the engine starter 47 with the engine start enabling signal. Thus, the starting of the engine is disabled. In this manner, the security system 51 induces the driver 13 to return the mechanical key 18 to the key retainer 17.

Figure 10B:
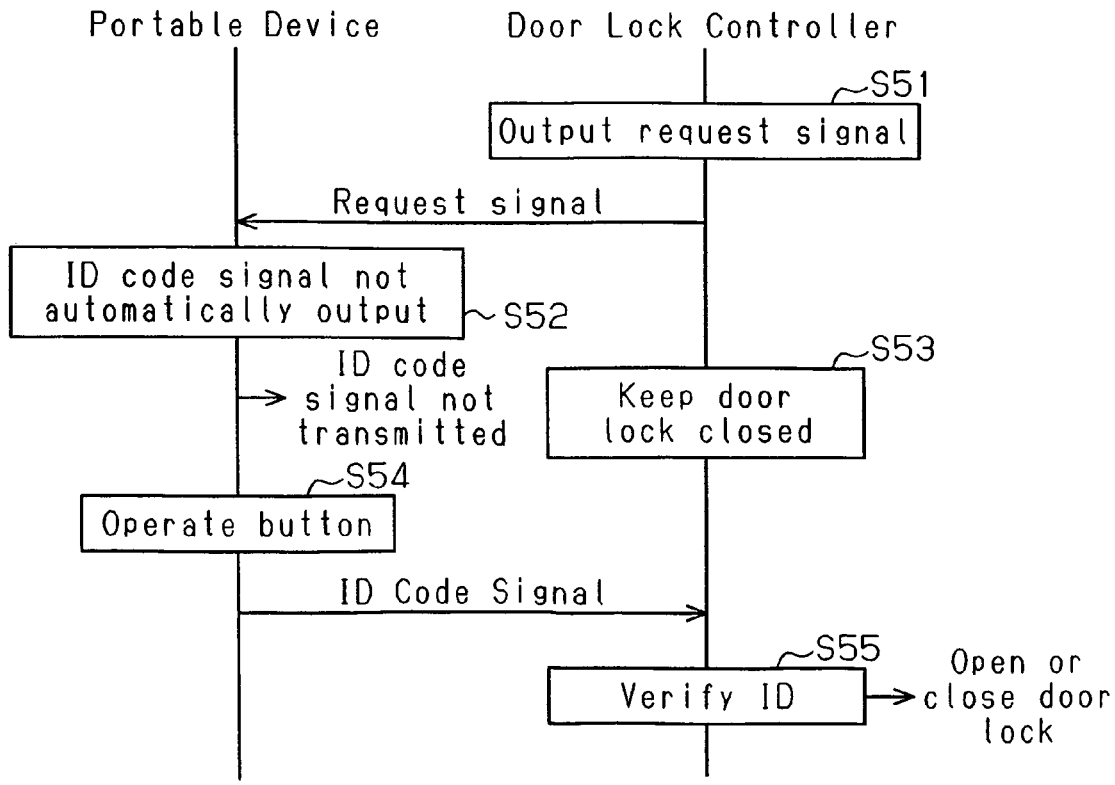

FIG. 10B, state in which the mechanical key 18 is not retained in the key retainer 17:

In step S51, the door lock controller 15 outputs the request signal in a predetermined range. When the mechanical key 18 is not retained in the key retainer 17, the portable device receiver circuit 20 is disconnected from the portable device microcomputer 22. Thus, in step S52, even if the driver 13, who is holding the portable device 52, is in the predetermined range, the portable device 52 does not automatically transmit the ID code signal in response to the request signal. In step S53, the door lock controller 15 does not receive the ID code signal and keeps the door locks closed. In this manner, the security system 51 lets the driver 13 know that the mechanical key 18 is not retained in the key retainer 17.

In step S54, when the driver 13 operates the push buttons 53, the portable device 52 transmits the ID code signal to the vehicle 12. In step S55, the door lock controller 15 receives the ID code signal, and the vehicle microcomputer 42 performs ID code verification. Then, the door lock controller 15 opens or closes the door locks in accordance with the verification result.

In the second embodiment, the portable device transmitter circuit 21, the portable device microcomputer 22, the vehicle receiver circuit 41, the vehicle microcomputer 42, the door lock actuator 45, and the push buttons 53 function as an activation controlling means, or a manual activation controlling means of the keyless entry system function.

The second embodiment has the advantages described below.

(4) When the mechanical key 18 is not retained in the key retainer 17, the security system 51 disables only the smart entry function. As a result, the driver 13 cannot open or close the door locks of the vehicle 12. This lets the driver 13 know that the mechanical key 18 is not retained in the portable device 52 and induces the driver 13 to retain the mechanical key 18 in the portable device 52. Accordingly, the driver 13 always keeps the mechanical key 18 in the portable device 52. This avoids a state in which the opening and closing of the vehicle door locks is disabled during an emergency.

(5) The security system 51 is provided with a smart entry function for automatically closing and opening the doors and a keyless entry function for closing and opening the doors by operating the push buttons 53. Thus, the door locks of the vehicle may be opened or closed by operating the push buttons 53 to activate the keyless entry function even when the mechanical key 18 is not retained in the portable device 52 and the smart entry function is disabled.

(6) In the security system 51 of the second embodiment, devices for letting the driver 13 know whether or not the mechanical key 18 is being retained in the portable device 52 (e.g., the portable device indicator 19a of FIG. 2 and the vehicle indicator 19b of FIG. 4) are not necessary. Further, space for such devices is not necessary. Since such devices are not necessary, the number of components is reduced and the manufacturing cost of the security system 51 is kept low.

(7) The signal line 27, which connects the portable device receiver circuit 20 and the portable device microcomputer 22, is closed only when the mechanical key 18 is retained in the key retainer 17. Thus, only the smart entry function is disabled when the mechanical key 18 is not retained in the key retainer 17.

(8) When the mechanical key 18 is not retained in the key retainer 17, the transponder 24 of the portable device 52 does not output the transponder signal, and the vehicle microcomputer 42 does not enable the starting of the engine. In this manner, the driver 13 can recognize whether or not the mechanical key 18 is retained in the key retainer 17 after opening or closing the door locks with the mechanical key 18. This prevents the driver 13 from forgetting to return the mechanical key 18 to the key retainer 17 and losing the mechanical key 18 after opening the door locks with the mechanical key 18.

A vehicle security system according to a third embodiment of the present invention will now be discussed centering on parts differing from the first and second embodiments.

Figure 11:
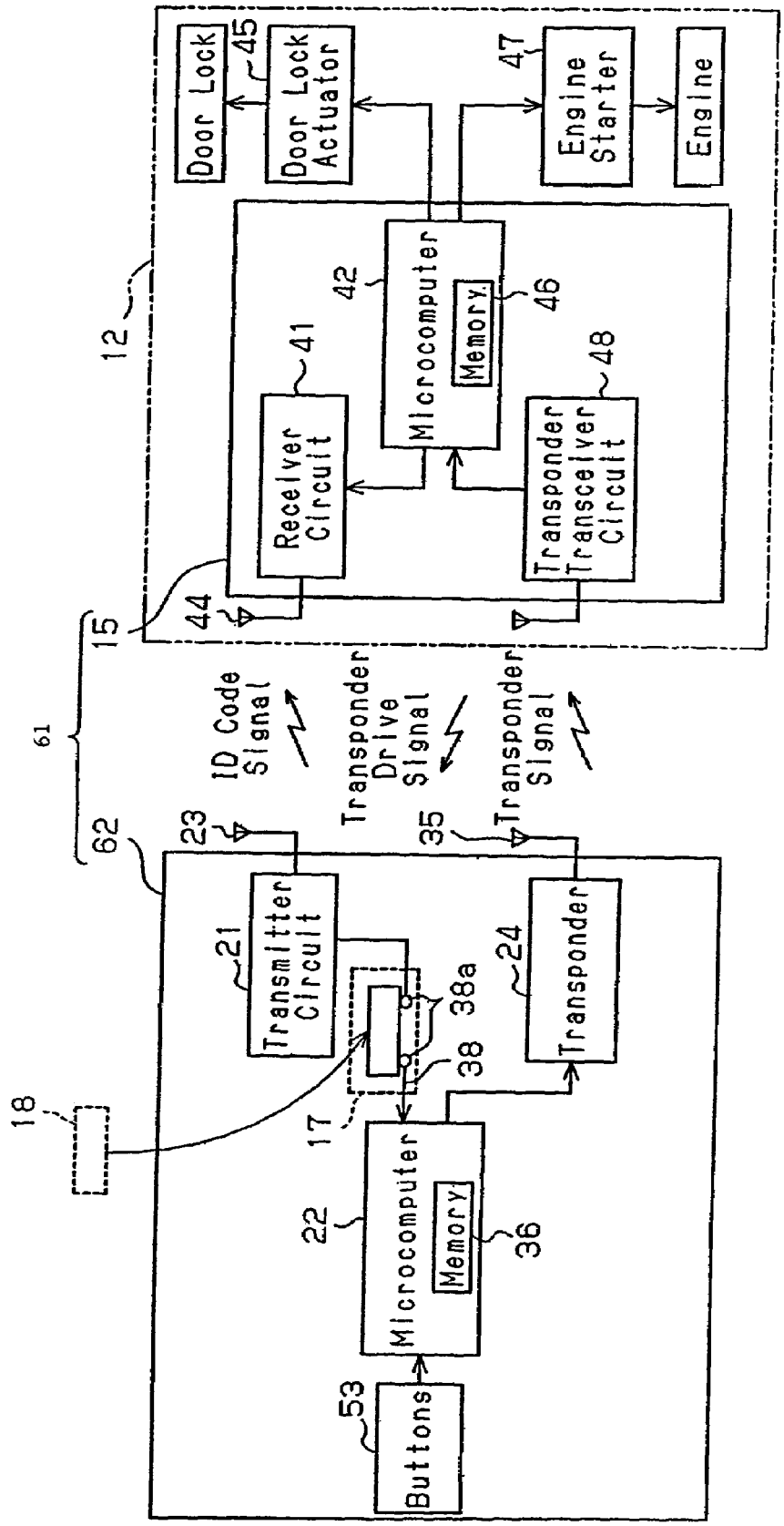
FIG. 11 is a block diagram illustrating a security system according to a third embodiment of the present invention.

Referring to FIG. 11, the security system 61 includes a portable device 62 and a door lock controller 15, which is installed in a vehicle 12. The portable device 62 includes a mechanical key 18, a portable device transmitter circuit 21, a portable device microcomputer 22, a transponder 24, and push buttons 53. When the push buttons 53 are operated, the portable device microcomputer 22 outputs an ID code signal. The security system 61 of the third embodiment is provided with a keyless entry function that enables the closing and opening of the door locks by operating the push buttons 53.

The portable device transmitter circuit 21 and the portable device microcomputer 22 are connected to the two ends of a signal line 38, which includes two contacts 38a. When the mechanical key 18 is retained in the key retainer 17, the key plate 18a of the mechanical key 18 connects the two contacts 38a. This electrically connects the portable device transmitter circuit 21 and the portable device microcomputer 22.

The contacts 38a are in an opened state when the mechanical key 18 is not retained in the key retainer 17. This electrically disconnects the portable device transmitter circuit 21 and the portable device microcomputer 22. In this state, the portable device transmitter circuit 21 does not receive the ID code signal from the portable device microcomputer 22. Thus, the door locks cannot be opened or closed even when the push buttons 53 are operated. Accordingly, the keyless entry function of the security system 61 is disabled.

The operation of the security system 61 will now be discussed.

When the mechanical key 18 is retained in the key retainer 17, the signal line 38 electrically connects the portable device transmitter circuit 21 and the portable device microcomputer 22 to enable the keyless entry function. The portable device 62 transmits an ID code signal when the driver 13 operates the push buttons 53. The door lock controller 15 receives the ID code signal. The vehicle microcomputer 42 then verifies the ID code and opens or close the door locks in accordance with the ID verification result.

When the mechanical key 18 is not retained in the key retainer 17, the portable device transmitter circuit 21 and the portable device microcomputer 22 are electrically disconnected. This disables the keyless entry function. Thus, the portable device 62 does not transmit the ID code signal even when the driver 13 operates the push buttons 53. Since the ID code signal is not received, the door lock controller 15 keeps the door locks closed. In this manner, the doors of the vehicle 12 cannot be unlocked and the security system 61 thus lets the driver 13 know that the mechanical key 18 is not retained in the key retainer 17.

It should be apparent to those skilled in the art that the present invention may be embodied in many other specific forms without departing from the spirit or scope of the invention. Particularly, it should be understood that the present invention may be embodied in the following forms.

The security system 11 of the first embodiment employs the portable device indicator 19a and the vehicle indicator 19b. However, the security system 11 may employ only one of the indicators 19a and 19b.

The portable device indicator 19a and the vehicle indicator 19b do not have to be a filament or an LED and may be a buzzer that emits a warning sound. The portable device indicator 19a may also have a vibration function for vibrating the portable device 14. Furthermore, the vehicle indicator 19b may be the hazard light or the directional signals of the vehicle that flash if the mechanical key 18 is not retained in the key retainer 17 when the driver moves away from the vehicle.

The key detection sensor 33 of the first embodiment does not have to be a movable contact type microswitch and may be a non-contact type sensor or a proximity switch.

In the second embodiment, the contacts 27a are provided in the signal line 27 that connects the portable device receiver circuit 20 and the portable device microcomputer 22. However, the disabling means may be modified to those used in security systems 64 and 66, which are respectively illustrated in FIGS. 12 and 13.

Figure 12:
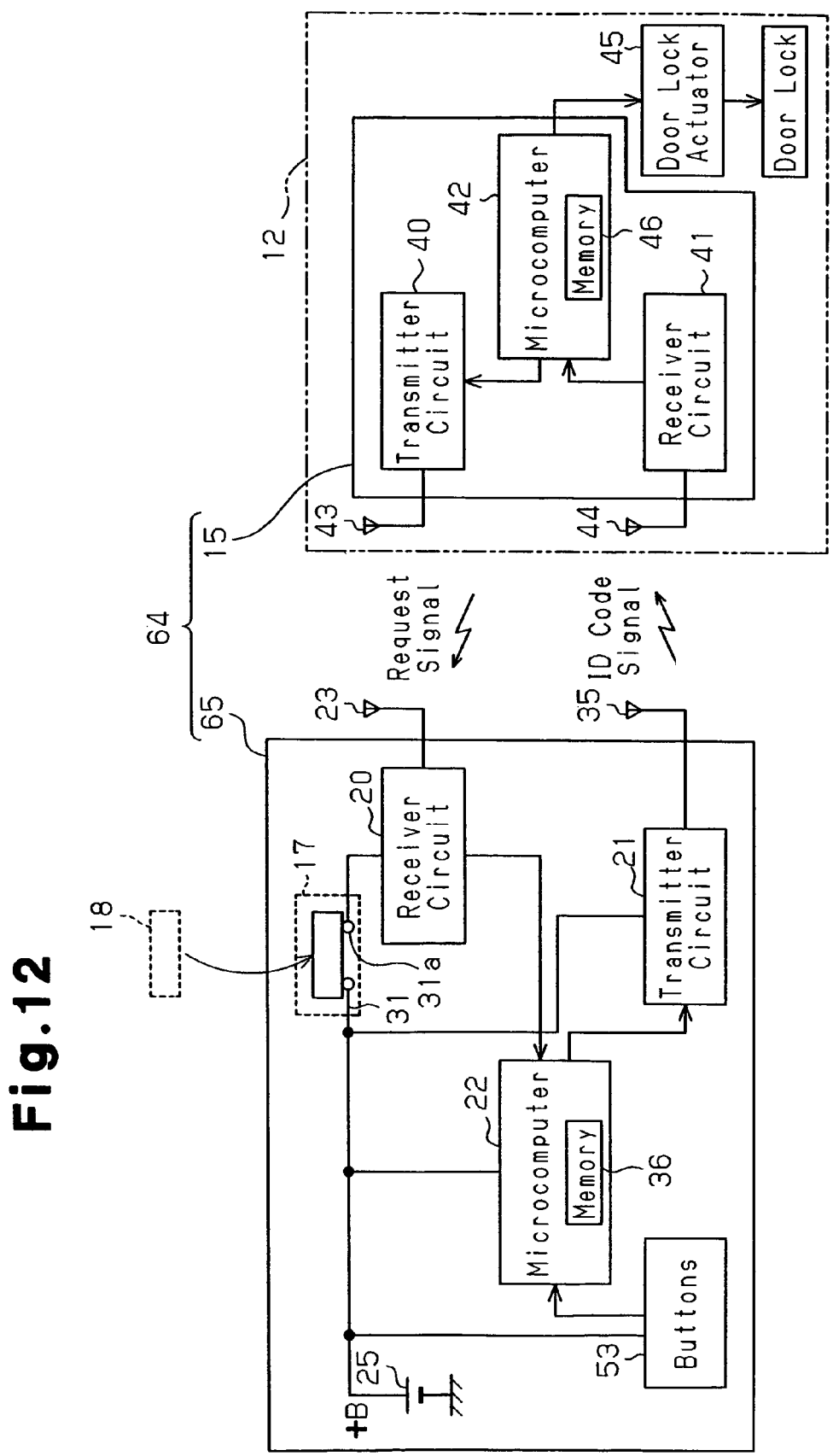
FIG. 12 is a block diagram of a security system according to a further embodiment of the present invention.

In the security system 64 of FIG. 12, contacts 31a are arranged along a power line 31, which connects the battery 25 and the portable device receiver circuit 20. In this case, the contacts 31a are closed when the mechanical key 18 is retained in the key retainer 17 of a portable device 65. This electrically connects the battery 25 and the portable device receiver circuit 20, and enables the closing and opening of the door locks with the smart entry function. When the mechanical key 18 is not retained in the key retainer 17 of the portable device 65, the battery 25 is disconnected from the portable device receiver circuit 20. This disables the closing and opening of the doors with the smart entry function.

Figure 13:
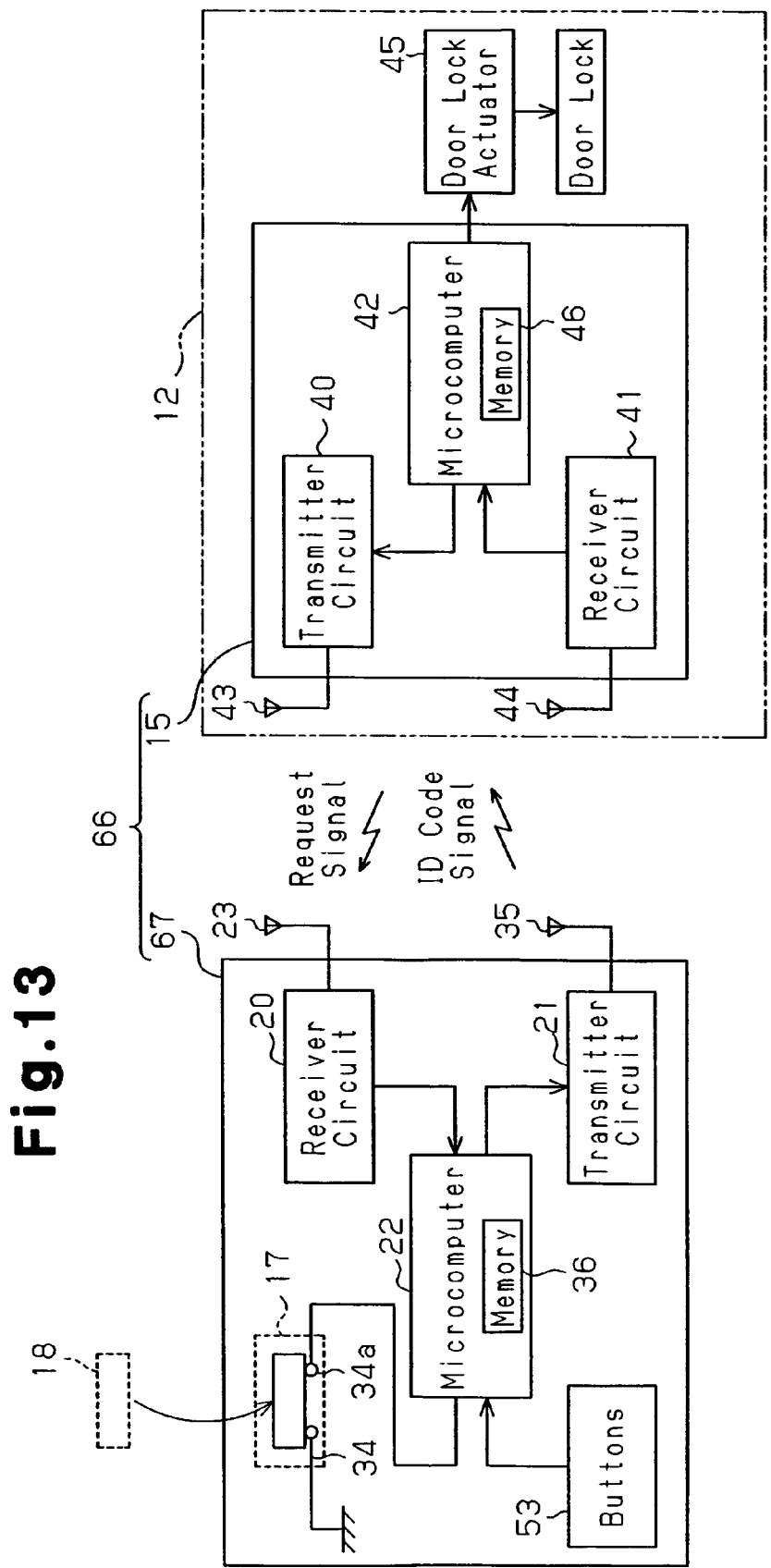
FIG. 13 is a block diagram of a security system according to a further embodiment of the present invention.

In the security system 66 of FIG. 13, contacts 34a are arranged along a ground line 34, which electrically connects the portable device microcomputer 22 to the ground. In this case, the mechanical key 18 is retained in the key retainer 17 of a portable device 67. This grounds the portable device microcomputer 22. Accordingly, the portable device microcomputer 22 outputs an ID code signal in response to the request signal and enables the smart entry function. When the mechanical key 18 is not retained in the key retainer 17, the portable device microcomputer 22 is not grounded. In this case, the portable device microcomputer 22 does not output the ID code signal in response to the request signal and disables the smart entry function.

Figure 14:
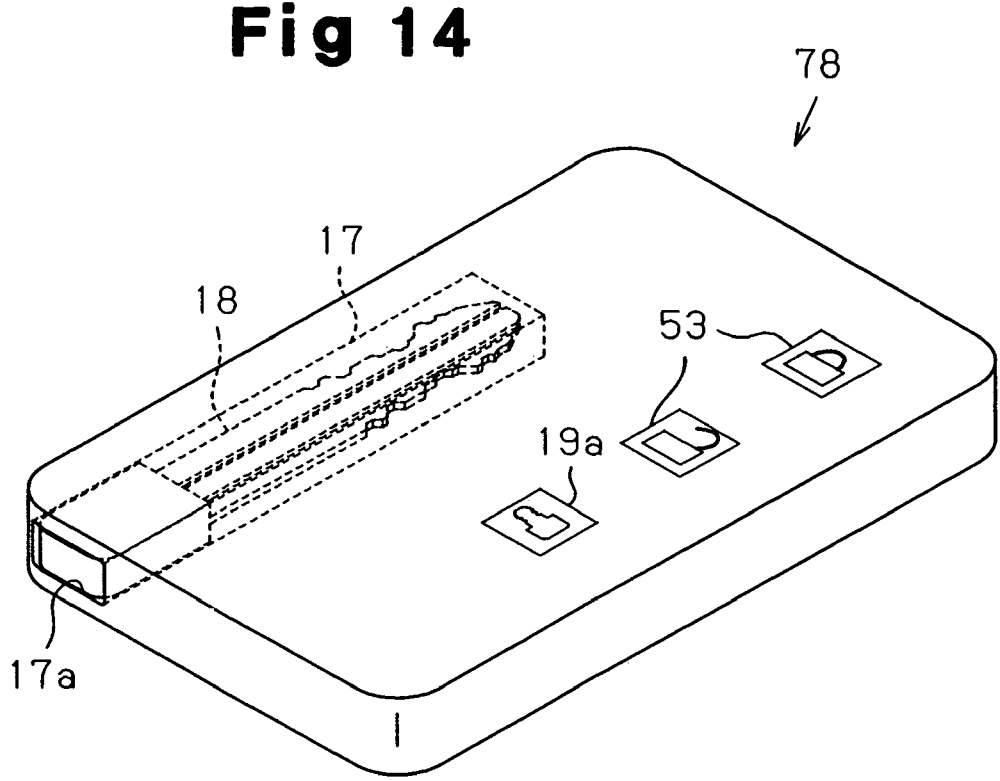
FIG. 14 is a perspective view showing a portable device according to a further embodiment of the present invention.
Figure 15:
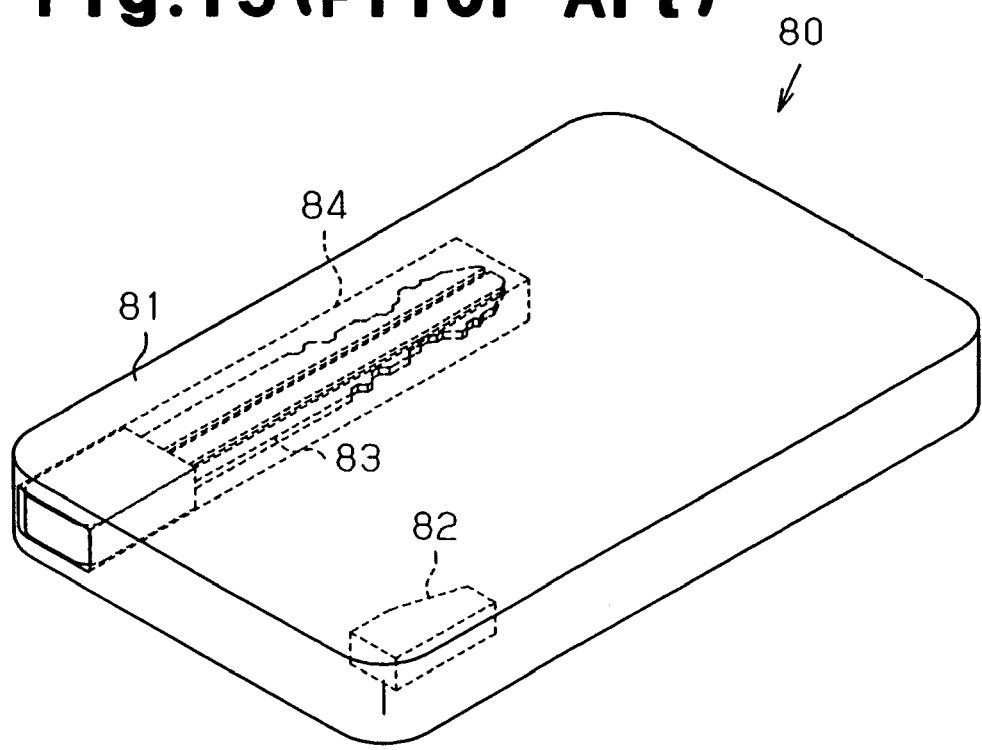
FIG. 15 is a perspective view showing a portable device of the prior art.

Referring to FIG. 14, a portable device 78 may be provided with the portable device indicator 19a and the push buttons 53.

In the second embodiment, instead of disabling the starting of the engine after opening the door locks of the vehicle 12 with the mechanical key 18, the activation of electric devices in the vehicle 12, such as the air conditioner or car stereo, may be disabled.

In addition to the door locks of the vehicle 12, the security systems 11, 51, and 61 may be applied to the door locks of a building, such as a house.

The security systems 11, 51, and 61 lets the driver 13 know of whether or not the mechanical key 18 is retained in the key retainer 17 by controlling the closing and opening of the doors with the smart entry function and the keyless entry function. Alternatively, the security systems 11, 51, and 61 may let the driver 13 know of whether or not the mechanical key 18 is retained in the key retainer 17 by controlling the activation of an electric device other than the door locks.

The present examples and embodiments are to be considered as illustrative and not restrictive, and the invention is not to be limited to the details given herein, but may be modified within the scope and equivalence of the appended claims.

What is claimed is:

1. A security system for use with a locked subject having a lock that can be electronically activated, the security system comprising:
    a mechanical key for mechanically opening and closing the lock of the locked subject;
    a portable device having:
        a wireless communication function and including a key retainer for retaining the mechanical key, wherein when the key retainer retains the mechanical key, the mechanical key is hidden in the portable device; and
        an operation portion that is operated to output an ID code signal;
    an activation controlling means for performing wireless communication between the locked subject and the portable device, wherein the locked subject outputs a request signal during the wireless communication, the portable device outputs an ID code signal in response to the request signal, and the activation controlling means controls the activation of the lock in accordance with the ID code signal; and
    a notifying means for notifying a person possessing the portable device that the mechanical key is not retained in the portable device wherein the notifying means includes:
        a key detector arranged in the portable device to detect whether the mechanical key is retained in the key retainer;
        a portable device warning device arranged in the portable device to provide a warning; and
        a portable device controller arranged in the portable device to control the portable device warning device to provide the warning when the key detector detects that the mechanical key is not retained in the key retainer, wherein the portable device controller includes:
            a manual activation controlling means for sending the ID code signal to the locked subject when the operation portion is operated to manually control the locked subject in accordance with the ID code signal from the portable device controller; and
            a disabling means for disabling the opening and closing of the lock of the locked subject with the activation controlling means or the manual activation controlling means when the mechanical key is not retained in the key retainer.

2. The security system according to claim 1, wherein the notifying means includes:
    a key detector arranged in the portable device to detect whether the mechanical key is retained in the key retainer;
    a portable device controller arranged in the portable device for outputting a warning signal when the key detector detects that the mechanical key is not retained in the key retainer;
    a locked subject warning device arranged in the locked subject to provide a warning; and
    a locked subject controller arranged in the locked subject for controlling the locked subject warning device to provide the warning when receiving the warning signal.

3. The security system according to claim 1, wherein the notifying means includes:
    a portable device warning device arranged in the portable device to provide a warning;
    a locked subject warning device arranged in the locked subject to provide a warning;
    a key detector for detecting whether the mechanical key is retained in the key retainer;
    a portable device controller for controlling the portable device warning device to provide the warning and send a warning signal to the locked subject when the key detector detects that the mechanical key is not retained in the key retainer; and
    a locked subject controller for controlling the locked subject warning device to provide the warning when receiving the warning signal.

4. The security system according to claim 1, wherein the locked subject is a vehicle including an electric device and an engine, and the security system disables at least one of activation of the electric device and starting of the engine when mechanical key is not retained in the key retainer.

5. A security system for use with a locked subject having a lock that can be electronically activated, the security system comprising:
    a mechanical key for mechanically opening and closing the lock of the locked subject;
    a portable device including a key retainer for retaining the mechanical key, the portable device performing wireless communication with the locked subject;

an operation portion arranged on the portable device;

a manual activation controlling means including a first control for performing control of the wireless communication between the locked subject and the portable device, and a second control for sending an ID code signal to the locked subject and activating the lock when the operation portion is operated; and a disabling means for disabling at least one of the controls of the manual activation controlling means when the mechanical key is not retained in the key retainer.

6. The security system according to claim 5, wherein the portable device includes:

a receiver circuit for receiving a request signal output from the locked subject;

a portable device controller for sending a warning signal to the locked subject when the mechanical key is not retained in the key retainer;

a signal line arranged between the portable device controller and the receiving circuit; and wherein the disabling means includes contacts arranged on the signal line, the contacts closing the signal line when the mechanical key is retained in the key retainer and opening the signal line when the mechanical key is not retained in the key retainer.

7. The security system according to claim 5, wherein the portable device includes:

a power supply;

a receiver circuit for receiving a request signal output from the locked subject;

a portable device controller for sending a warning signal to the locked subject in response to the request signal when the mechanical key is not retained in the key retainer;

a power line arranged between the power supply and the receiving circuit; and wherein the disabling means includes contacts arranged on the power line, the contacts closing the power line when the mechanical key is retained in the key retainer and opening the power line when the mechanical key is not retained in the key retainer.

8. The security system according to claim 5, wherein the portable device includes:

a receiver circuit for receiving a request signal output from the locked subject;

a portable device controller for sending a warning signal to the locked subject in response to the request signal when the mechanical key is not retained in the key retainer;

a ground line arranged between the portable device controller and the ground; and wherein the disabling means includes contacts arranged on the ground line, the contacts closing the ground line when the mechanical key is retained in the key retainer and opening the power line when the mechanical key is not retained in the key retainer.

9. The security system according to claim 5, wherein the locked subject is a vehicle including an electric device and an engine, and the security system disables at least one of activation of the electric device and starting of the engine when the mechanical key is not retained in the key retainer.

10. A security system comprising:

a door lock of a vehicle;

a mechanical key for mechanically opening and closing the lock;

a portable device having an operation portion operated to open and close the door lock, and including a wireless key that performs wireless communication and a key retainer for retaining the mechanical key, wherein when the key retainer retains the mechanical key, the mechanical key is hidden in the portable device;

a lock controller, installed in the vehicle for opening and closing the lock when wireless communication with the wireless key is established;

a sensor arranged in the wireless key to detect whether the mechanical key is retained in the retainer; and a notifying device for notifying a person carrying the portable device that the mechanical key is not being retained in the key retainer wherein the notifying device is one of or a combination of a light that is illuminated, a buzzer that emits a warning sound, and a vibration device that vibrates the portable device when the mechanical key is not retained in the key retainer of the portable device, wherein:

the security system is provided with a keyless entry function that opens and closes the door when the operation portion is operated in the vicinity of the vehicle; and the notifying device notifies the driver of the vehicle that the mechanical key is not retained in the key retainer by disabling at least one of starting of the engine and the keyless entry function.

11. The security system according to claim 10, wherein the lock is a door lock of a vehicle, the lock controller is installed in the vehicle, and the notifying device includes a light that is arranged in the vehicle and activated when the mechanical key is not retained in the key retainer.

12. A portable device for use in a security system that includes a locked subject having a lock, wherein the security system controls opening and closing of the lock in accordance with an ID code signal, the portable device being characterized by:

a key retainer for retaining a mechanical key that mechanically opens and closes the lock, wherein when the key retainer retains the mechanical key, the mechanical key is hidden in the portable device;

a key detector for detecting whether the mechanical key is retained in the key retainer, wherein the portable device is operable for outputting the ID code signal; and a disabling means for disabling the portable device performing at least one of signal transmitting and signal receiving when the mechanical key is not retained in the key retainer, to notify a person possessing the portable device that the mechanical key is not retained in the portable device.

* * * * *